Nov. 26, 1929.　　W. L. CARPENTER　　1,737,216
SAW CLAMP
Filed Sept. 8, 1927　　2 Sheets-Sheet 1
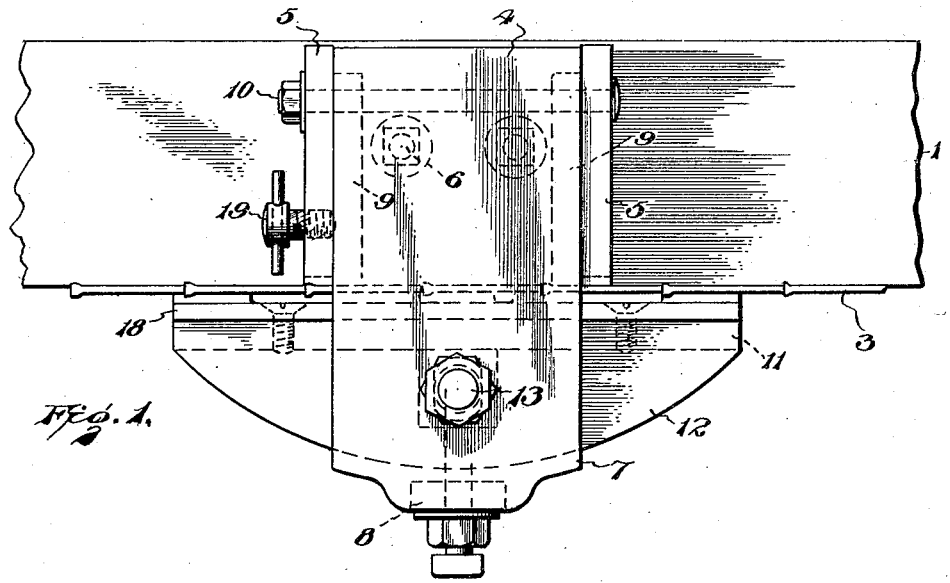
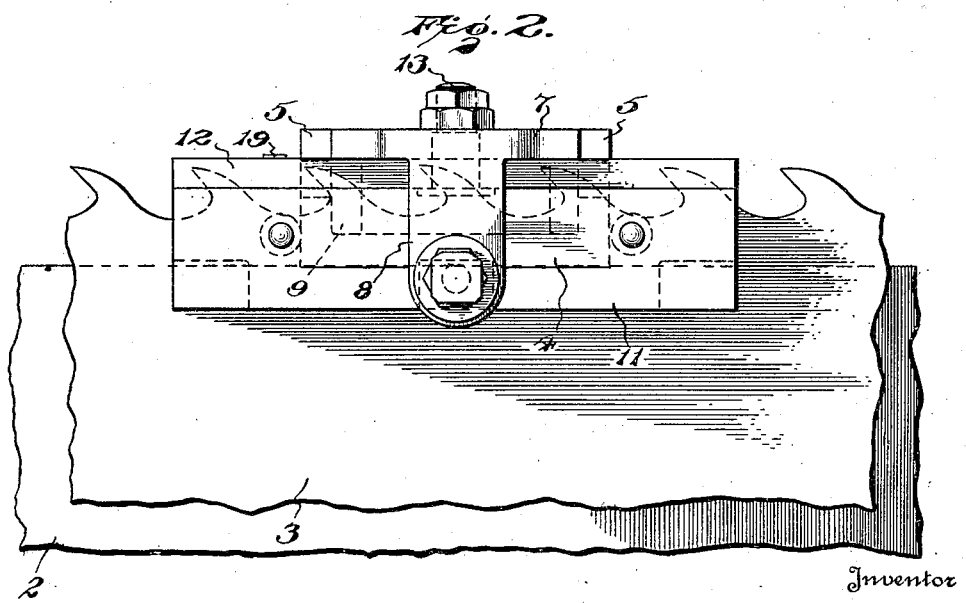
Inventor
W. L. Carpenter
By Lacey & Lacey, Attorneys

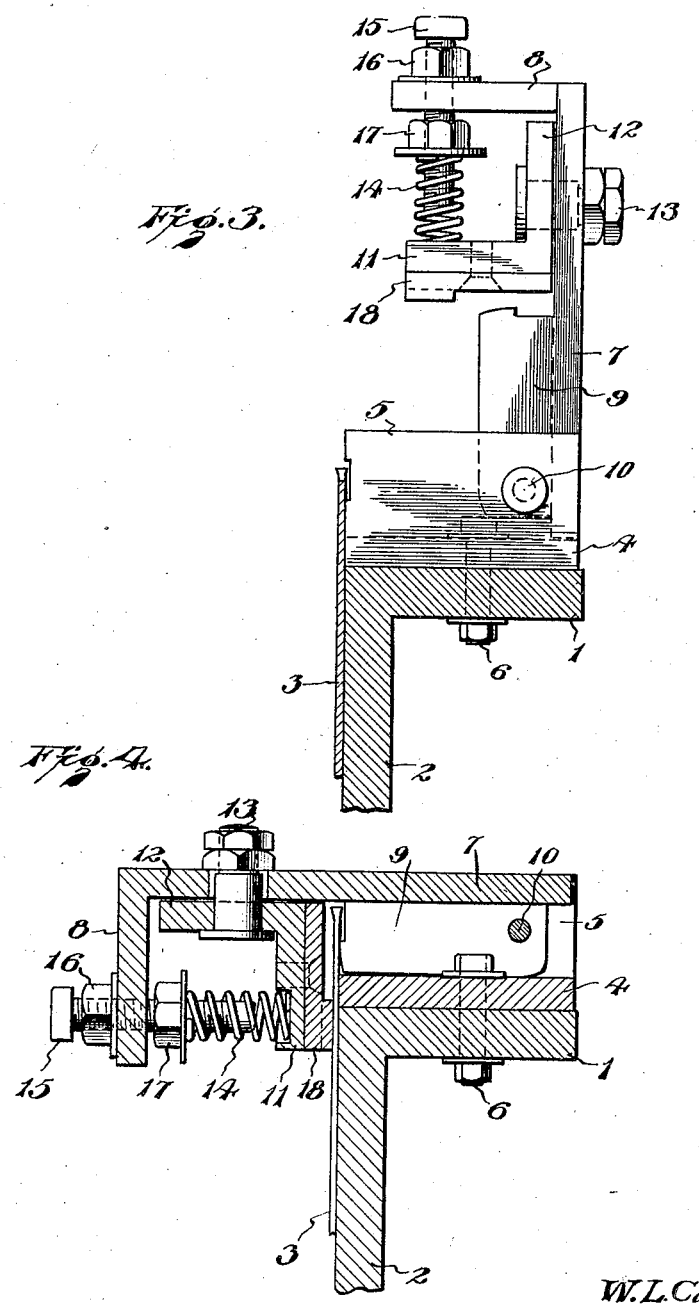

Patented Nov. 26, 1929

1,737,216

UNITED STATES PATENT OFFICE

WILFRED L. CARPENTER, OF CEDAR GROVE, LOUISIANA

SAW CLAMP

Application filed September 8, 1927. Serial No. 218,190.

This invention provides an auxiliary, or anti-back lash gate for band saw grinding machines, whereby to more securely hold the saw in its stop position during the process of grinding, to the end that a positive gate control is assured; the saw enabled to be ground in a less number of revolutions around the grinder, thus saving time and prolonging the life of the saw since frequent grinding is not required; the necessity for repeated swaging overcome by reason of the uniform and even grinding which also results in uniform swaging; a smoother and faster cutting saw produced; the swaging and shaping of the saw made possible prior to the actual grinding of the saw which may be swaged during the process of first time grinding without the liability of pulling the saw back and producing irregular grinding, consequently saving time and grinding; and the danger of chopping off teeth eliminated through failure of the feeder to function.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is a top plan view of a band saw clamp embodying the invention, showing the same in operative position.

Figure 2 is a front view of the parts illustrated in Figure 1.

Figure 3 is a side view of the clamp showing the same in open position.

Figure 4 is a sectional view of the clamp showing it closed.

Corresponding and like parts are referred to in the following description and designated in the several views of the drawings by like reference characters.

The invention is adapted for use in connection with any type or make of band saw grinding machine, it being observed that two clamps are provided and disposed one at each side of the main clamp, whereby to supplement the action thereof in securely holding the saw during the grinding and swaging thereof. A portion of the frame of a grinding machine is illustrated to provide a support for the clamp and the saw, and this frame comprises a horizontal portion 1, and a vertical portion 2, the horizontal portion 1 forming a bed to receive the clamp and the vertical portion 2 providing a way and guide for the band saw 3 which is clamped thereagainst in any usual or preferred way by the ordinary holding means and by two clamps, such as illustrated in the accompanying drawings. The present clamp is mounted upon and secured to the horizontal or bed portion 1 of the grinder frame, and comprises a portion which is adapted to extend over the saw 3 and downwardly in front thereof so as to clamp the saw between the way or guide portion 2 of the frame and the gripping portion of the clamp. The base of the clamp comprises a plate 4 and spaced uprights 5, the plate being provided with openings to receive bolts 6 for fastening the clamp to the frame of the grinder. The uprights 5 are elongated and extend in parallel relation. In the preferable construction the component parts of the base are of integral formation, being cast.

The movable part of the clamp comprises a plate 7 which is pivoted at one end to the base and which is provided at its opposite end with an offstanding portion 8 disposed at a right angle to the plate 7. The plate 7 is of a width to fit snugly between the uprights 5 of the base, and is provided along opposite marginal edges with flanges 9 which are adapted to fit snugly between the uprights 5. A bolt 10 passes through registering openings formed in the uprights 5 and flanges 9 and pivotally connects the movable part of the clamp to the base. The flanges 9 do not extend the full length of the plate 7 and their rear ends constitute stops to engage the plate 4 and hold the movable part of the clamp in upright or vertical position, as indicated most clearly in Figure 3 of the drawings. The outer or forward ends of the flanges 9 are adapted to engage the saw 3 when the clamp is closed, as indicated most clearly in Figure 4 of the drawings. A portion of the forward ends of the flanges 9 is cut away to clear the swaged ends of the saw teeth, as indicated most clearly in Figure 4 of the drawings. A portion of the forward ends of the uprights 5 is similarly cut away for a like purpose, as indicated most clearly in Figure 3 of the drawings. The saw when clamped, engages the forward ends of the uprights 5 and flanges 9.

The gripping portion of the clamp comprises a jaw 11 from which projects a flange 12 which is arranged in contact with the plate 7 to which it is adjustably connected by means of a bolt 13. The opening formed in the plate 7 for reception of the bolt 13 is elongated to admit of a limited movement of the jaw 11 towards and away from the saw 3. An open helical spring 14 normally urges the jaw 11 rearwardly, so as to clamp the saw 3 between the said jaw and the parts 9, 5, 4 and 1. The spring 14 is mounted upon the inner end of a screw 15 which is threaded into an opening formed in the offstanding part 8 of the plate 7. Nuts 16 and 17 are mounted upon the screw 15, the nut 16 acting as a binder to secure the screw in the required adjusted position, and the nut 17 serving as means for adjusting the tension of the spring 14 to cause the jaw 11 to clamp the saw 3 with a greater or less pressure. It is observed that by manipulating the screw 15 and nut 16 the tension of the spring 14 may be regulated without moving the nut 17. A facing 18 of wood is applied to the outer side of the jaw 11, and provides a yieldable gripping surface. Portions of the facing 18 are cut away to clear the teeth of the saw and to concentrate the gripping pressure at determinate points. The arrangement is such as to enable the jaw 11 to be adjusted to exert a variable pressure upon the saw to prevent movement thereof or to admit of adjustment of the saw to bring the teeth in position for grinding and swaging. When the movable part of the clamp is thrown upwardly, as indicated most clearly in Figure 3 of the drawings, it clears the saw and does not in any manner interfere with adjustment and manipulation thereof, as required. When the clamp is closed the movable part extends over the saw and downwardly in front thereof, as indicated most clearly in Figure 4 of the drawings. In practice two clamps, substantially as herein described, are provided, and are located upon opposite sides of the usual clamp of the saw grinder, with the result that the saw is held between three clamps, and is maintained in proper position for grinding and swaging, and is prevented from undue movement which would tend to produce irregular grinding and prolong the operation of sharpening. Provision is had for securing the movable member of the clamp when in active or closed position, the same consisting of a screw 19 threaded into one of the uprights 5, and adapted to engage the adjacent edge or side of the movable member, as indicated most clearly in Figure 1 of the drawings.

Having thus described the invention, I claim:

1. A band saw clamp comprising a base, a movable member pivoted at one end to the base, and having an offset portion at its opposite end, a jaw adapted to coact with the base to clamp the saw, means adjustably connecting the jaw to the movable member, a screw mounted in the offset portion of the movable member, and a spring mounted upon the screw and normally exerting a pressure upon the jaw to cause it to grip the saw by a yielding pressure.

2. A band saw clamp comprising a base including a plate and spaced parallel uprights, a movable member comprising a plate and flanges, the latter engaging the uprights of the base, a pivot connecting the flanges and uprights, the movable member having an offset portion at its swinging end, a jaw adapted to coact with the base to clamp the saw, means adjustably connecting the jaw to the movable member, a screw mounted in the offset portion of the movable member, and a spring mounted upon the screw and adapted to exert a yielding pressure upon the jaw.

3. A band saw clamp comprising a base, a plate pivoted to the base and projecting forwardly thereof and having a depending portion at its outer forward end, a jaw having a flange in contact with the bottom side of the forwardly projecting portion of the said plate, said jaw coacting with the base to clamp the saw, a connection between the flange and plate admitting of the jaw having a limited inward and outward movement, a screw mounted in the depending portion of the before mentioned plate, a spring mounted on the screw and adapted to exert a pressure upon the jaw, and nuts mounted on the screw for adjusting the tension of the spring, and holding the screw in the required adjusted position.

4. A band saw clamp comprising a base formed with spaced uprights, a plate movable between the uprights and formed with depending flanges pivoted to the said uprights and projecting forwardly from the base and having a depending portion at its outer end, a jaw adapted to coact with the base and the uprights and flanges to clamp the saw, and formed with a flange in contact with the bottom side of the forwardly projecting portion of the plate, a connection between the flange and plate admitting of the jaw having a limited inward and outward movement, a screw mounted in the depending portion of the plate, and a spring mounted upon the screw and adapted to exert a pressure upon the jaw.

In testimony whereof I affix my signature.

WILFRED L. CARPENTER. [L. S.]